(12) United States Patent
Hannuksela et al.

(10) Patent No.: US 6,744,924 B1
(45) Date of Patent: Jun. 1, 2004

(54) ERROR CONCEALMENT IN A VIDEO SIGNAL

(75) Inventors: Miska Hannuksela, Tampere (FI); Ari Johannes Hourunranta, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/432,390

(22) Filed: Nov. 2, 1999

(30) Foreign Application Priority Data

Nov. 2, 1998 (GB) ............................................. 9823898

(51) Int. Cl.$^7$ ................................................ G06K 9/46
(52) U.S. Cl. ...................................... 382/232; 236/238
(58) Field of Search .................................. 382/232, 236, 382/238, 239, 251–253; 348/398, 408, 412, 415; 325/240.15, 240.27

(56) References Cited

U.S. PATENT DOCUMENTS

| | | | |
|---|---|---|---|
| 5,146,324 A | 9/1992 | Miller et al. ............ | 375/240.03 |
| 5,146,325 A | 9/1992 | Ng ......................... | 348/384.1 |
| 5,212,549 A | * 5/1993 | Ng et al. ................. | 375/240.15 |
| 5,438,374 A | 8/1995 | Yan ......................... | 348/620 |
| 5,706,053 A | 1/1998 | Urano .................... | 375/240.15 |
| 5,727,088 A | 3/1998 | Kim ........................ | 382/238 |
| 5,910,827 A | * 6/1999 | Kwan et al. ............ | 375/240.27 |
| 5,974,183 A | * 10/1999 | Wilkinson .............. | 382/236 |
| 5,991,445 A | * 11/1999 | Kato ...................... | 382/232 |

FOREIGN PATENT DOCUMENTS

| | | | |
|---|---|---|---|
| DE | 19636867 | 1/1998 | |
| EP | 551599 A1 | * 7/1993 | ............ H04N/5/92 |
| GB | 2277655 | 11/1994 | |
| JP | 7170513 | 4/1995 | ............ H04N/7/24 |
| JP | 07170513 | 7/1995 | |

OTHER PUBLICATIONS

Stephan Wenger, "Simulation Results for H.263+ Error Resilience Modes K, R, N on the Internet", ITU–T, SG16, Question 15, document Q15–D–17, Apr. 7, 1998.

* cited by examiner

Primary Examiner—Leo Boudreau
Assistant Examiner—Duy M. Dang
(74) Attorney, Agent, or Firm—Antonelli, Terry, Stout & Kraus, LLP

(57) ABSTRACT

Apparatus and method for concealing an error in a frame of a video sequence. The video sequence includes a plurality of frames and being encoded as at least two independently-coded signals, each of which represents a sub-set of frames of the video sequence. The method includes receiving said at least two signals, identifying an error in a frame of the video sequence, and concealing the error by predicting corresponding data using at least one frame which is encoded in a signal 10b other than that in which the error is identified.

43 Claims, 4 Drawing Sheets

ERROR CONCEALMENT IN A VIDEO SIGNAL

BACKGROUND OF THE INVENTION

This invention relates to error concealment in a video signal and to a method and apparatus therefore.

One of the recent targets in mobile telecommunications has been to increase the speed of the data transmission in order to enable incorporation of multimedia services to mobile networks. One of the key components of multimedia is digital video. Transmission of video comprises a continuous traffic of data representing moving pictures. As is generally known, the amount of data needed to transfer pictures is high compared to many other types of media, and so far usage of video in low bit-rate terminals has been negligible. However, significant progress has been achieved in the area of low bit-rate video compression. Acceptable video quality can be obtained at bit-rates around 20 kilo bits per second. As a result of this progressive reduction in bit-rate, it is expected that video is shortly going to become a viable service to offer over channels such as mobile channels.

A video sequence consists of a series of still images or frames. Video compression methods are based on reducing the redundancy and perceptually irrelevant parts of video sequences. The redundancy in video sequences can be categorised into spatial, temporal and spectral redundancy. Spatial redundancy means the correlation between neighbouring pixels within a frame. Temporal redundancy means the correlation between areas of successive frames. Temporal redundancy arises from the likelihood of objects appearing in a previous image appearing in the current image too. Compression can be achieved by generating motion compensation data which describes the motion (i.e. displacement) between similar areas of the current and a previous image. The current image is thus predicted from the previous one. Spectral redundancy means the correlation between the different colour components of the same image.

However, sufficient compression cannot usually be achieved by just reducing the redundancy of the sequence. Thus, video encoders try to reduce the quality of those parts of the video sequence which are subjectively the least important. In addition, the redundancy of the encoded bitstream is reduced by means of efficient lossless coding of compression parameters and coefficients. The main technique is to use variable length codes.

Video compression methods typically differentiate images which can or cannot utilise temporal redundancy reduction. Compressed images which do not utilise temporal redundancy reduction methods are usually called INTRA or I-frames whereas temporally predicted images are called INTER or P-frames. In the INTER frame case, the predicted (motion-compensated) image is rarely precise enough and therefore a spatially compressed prediction error image is also associated with each INTER frame.

Compressed video is easily corrupted by transmission errors, mainly for two reasons. Firstly, due to utilisation of temporal predictive differential coding (INTER frames), an error is propagated both spatially and temporally. In practice, this means that once an error occurs, it is easily visible to the human eye for a relatively long time. Especially susceptible are transmissions at low bit-rates where there are only a few INTRA-coded frames (the transmission of INTRA-coded frames would stop the temporal error propagation). Secondly, the use of variable length codes increases the susceptibility to errors. When a bit error alters the codeword to another one of different length, the decoder will lose codeword synchronisation and also decode subsequent error-free codewords (comprising several bits) incorrectly until the next synchronisation code. (A synchronisation code is a bit pattern which cannot be generated from any legal combination of other codewords.) Every bit in a compressed video bitstream does not have an equal importance to the decompressed images. Some bits belong to segments defining vital information such as picture type (e.g. INTRA or INTER), quantiser value and optional coding modes that have been used. In H.263, the most vital information is gathered in the picture header. A transmission error in the picture header typically causes a total misinterpretation of the subsequent bits defining the picture content. Due to utilisation of temporal predictive differential coding (INTER frames), the error is propagated both spatially and temporally. Thus, a normal approach to picture header corruption is to freeze the previous picture on the screen, to send an INTRA picture request to the transmitting terminal and to wait for the requested INTRA frame. This causes an annoying pause in the received video.

Transmission errors have a different nature depending on the underlying network. In packet-switched networks, transmission errors are typically packet losses (due to congestion in network elements). In circuit-switched networks, transmission errors are typically bit errors where a '1' is corrupted to '0' or vice versa.

To impede degradations in images introduced by transmission errors, retransmissions can be used, error detection and/or error correction methods can be applied, and/or effects from the received corrupted data can be concealed. Normally retransmission provides a reasonable way to protect video data streams from errors, but large round-trip delays associated with low bit-rate transmission and moderate or high error rates make it practically impossible to use retransmission, especially with real-time videophone applications. Error detection and correction methods usually require large overhead since they add some redundancy to the data. Consequently, for low bit-rate applications, error concealment can be considered as a preferred way to protect and recover images from transmission errors. Video error concealment methods are typically applicable to transmission errors occurring through packet loss and bit corruption.

H.263 is an ITU-T recommendation of video coding for low bit-rate communication which generally means data rates below 64 kbps. The recommendation specifies the bitstream syntax and the decoding of the bitstream. Currently, there are two versions of H.263. Version 1 consists of the core algorithm and four optional coding modes. H.263 version 2 is an extension of version 1 providing twelve new negotiable coding modes.

Pictures are coded as luminance (Y) and two colour difference (chrominance) components ($C_B$ and $C_R$). The chrominance pictures are sampled at half the resolution of the luminance picture along both co-ordinate axes. Picture data is coded on a block-by-block basis, each block representing 8×8 pixels of luminance or chrominance.

Each coded picture, as well as the corresponding coded bitstream, is arranged in a hierarchical structure with four layers, which are from bottom to top: block layer, macroblock layer, picture segment layer and picture layer. The picture segment layer can either be arranged as a group of blocks or a slice.

Block layer data consists of uniformly quantised discrete cosine transform coefficients, which are scanned in zigzag order, processed with a run-length encoder and coded with variable length codes.

Each macroblock relates to 16×16 pixels of luminance and the spatially corresponding 8×8 pixels of chrominance components. In other words, a macroblock consists of four 8×8 luminance blocks and the two spatially corresponding 8×8 colour difference blocks. Each INTER macroblock is associated with a motion vector which defines the position of a corresponding area in the reference frame which resembles the pixels of the INTER macroblock. The INTER macroblock data comprises coded prediction error data for the pixels of the macroblock.

Usually, each picture is divided into groups of blocks (GOBs). A group of blocks (GOB) typically comprises 33 macroblocks (arranged as 3 rows of 11 macroblocks). Data for each GOB consists of an optional GOB header followed by data for the macroblocks within the GOB.

If the optional slice structured mode is used, each picture is divided into slices instead of GOBs. A slice contains a number of consecutive macroblocks in scan-order. Data for each slice consists of a slice header followed by data for the macroblocks of the slice.

The picture layer data contain parameters affecting the whole picture area and the decoding of the picture data. The coded parameter data is arranged in a so-called picture header.

Picture and GOB (or slice) headers begin with a synchronisation code. No other code word or a legal combination of code words can form the same bit pattern as the synchronisation codes. Thus, the synchronisation codes can be used for bitstream error detection and for resynchronisation after bit errors. The more synchronisation codes that are added to the bitstream, the more error-robust the system becomes.

The Video Redundancy Coding (VRC) method has been introduced in several papers (e.g. Stephan Wenger, "Simulation Results for H.263+ Error Resilience Modes K, R, N on the Internet", ITU-T, SG16, Question 15, document Q15-D-17, Apr. 7, 1998). Its objective is to provide graceful video quality degradation against packet losses in packet-switched networks. The following paragraphs explain the basics of the method.

The principle of the VRC method is to divide the sequence of pictures into two or more signals (or threads) in such a way that all frames are assigned to one of the threads in an interleaved fashion to form subsets of frames. Each thread (or subset of frames) is coded independently. Obviously, the frame-rate within one signal is much lower than the overall frame rate: half in the case of two threads (signals), a third in the case of three threads and so on. This may result in a substantial coding penalty because of the generally larger changes and the longer motion vectors typically required to represent accurately the motion related changes, between two INTER-frames within a signal or thread. At regular intervals, all the signals converge into a so-called Sync frame. From this Sync frame, a new series of threads is started.

If one of the threads containing a subset of frames is damaged because of, say, a packet loss, the remaining threads stay intact and can be used to predict the next Sync frame. It is possible to continue the decoding of the damaged signal, which leads to slight picture degradation, or to stop its decoding which leads to a drop of the frame rate. If the size of the subsets is kept reasonably small, however, degradation will persist only for a very short time, until the next Sync frame is reached.

The decoder selects a Sync frame from one of the undamaged threads to decode the Sync frame. This means that the number of transmitted I-pictures can be kept small, because there is no need for complete re-synchronisation.

If all threads are damaged between two Sync frames, it is not possible to accurately predict a Sync frame. In this situation, annoying artifacts will be present until the next I-picture is decoded correctly, as would be the case if VRC were not employed.

Currently, Video Redundancy Coding can be used with ITU-T H.263 video coding standard (version 2) if the optional Reference Picture Selection mode (Annex N) is enabled. However, there are no major obstacles to incorporating Video Redundancy Coding into other video compression methods too.

Most known error concealment techniques are based on spatial and temporal interpolation schemes. Spatial interpolation is used in INTRA frames and INTRA-coded areas of INTER frames. Spatial interpolation means that lost areas are interpolated from spatially neighbouring areas. This can be done for example using the distance weighted average of the boundary pixels.

Error concealment using temporal interpolation is more often used in low bit-rate video coding, since the number of INTRA frames is usually rather low. A very basic temporal interpolation scheme copies the lost areas from the same positions of the previous frame, i.e., it treats the lost blocks as "not coded" blocks. In more advanced schemes, motion compensation is performed using either the median or average of the motion vectors of spatially neighbouring blocks. There have also been some proposals to use boundary pixel matching to find best motion vectors for the lost block.

In low resolutions and at low bit-rates, the correlation between spatially neighbouring blocks is often rather low. Thus interpolated motion vectors based on spatially neighbouring pixel data may be far from the original values. This means that one-directional concealment schemes often fail to reconstruct the original blocks. Furthermore, if only motion vectors are used for concealment without even trying to recover the prediction error blocks, the picture becomes blurred, since a great amount of detail will be lost. In practice, using current concealment schemes, errors or incorrectly concealed blocks are visible for a relatively long time.

Previously proposed utilisation of VRC in error-prone environments suffers from a few problems. First, if the interval between Sync frames is short (often the thread length has been proposed to be 5 frames), compression efficiency is compromised. On the other hand, if the threads are longer, error concealment tends not to be effective and picture quality is compromised.

SUMMARY OF THE INVENTION

In accordance with a first aspect of the invention there is provided a method of concealing an error in a frame of a video sequence, said video sequence comprising a plurality of frames and being encoded as at least two independently-coded signals, each of which represents a sub-set of frames of the video sequence, the method comprising receiving data representing a frame of the video sequence, identifying an error in the frame and concealing the error by predicting corresponding data using at least one frame which is encoded in a signal other than that in which the error is identified.

Thus the invention relates to a multi-threaded video coding scheme in which an erroneous area is concealed by interpolating temporally and preferably bidirectionally from uncorrupted frames of another VRC thread.

The invention provides means to achieve better image error concealment than prior-art solutions. Compared to prior-art Video Redundancy Coding methods, it makes it possible to use longer threads between Sync frames, thus increasing the compression efficiency.

Preferably the corresponding data is predicted bidirectionally i.e. using frames which occur in the video sequence previous and subsequent to the frame in which the error is identified, said previous and subsequent frames being encoded in at least one signal other than that in which the error is identified.

Most advantageously, the corresponding data may be predicted using frames which occur in the video sequence immediately previous and/or subsequent to the frame in which the error is identified, said previous and subsequent frames being present in at least one other signal.

The error may be initially concealed by predicting the corresponding data from a frame occurring previous to the said frame in the same signal as the frame in which the error is identified.

When the encoded signals include header information, a frame having an error in the header may be reconstructed by identifying an error in the header of a frame, determining whether the frame is an interframe-coded frame and, if so, predicting corresponding data using at least one frame which is encoded in a signal other than that in which the error is identified.

According to a second aspect of the invention a method of video decompression comprises receiving at least two signals representing a video sequence, said video sequence comprising a plurality of frames, each signal representing a sub-set of frames of the video sequence, identifying an error in a frame of the video sequence, concealing the error in the frame by predicting corresponding data using at least one frame which is encoded in a signal other than that in which the error is identified, and displaying the frames of the video sequence.

A third aspect of the invention relates to video error concealment apparatus for concealing an error in a frame of a video sequence, said video sequence comprising a plurality of frames and being encoded as at least two independently-coded signals, each of which represents a sub-set of frames of the video sequence, the apparatus comprising: an input for receiving said at least two signals, identifying an error in a frame of the video sequence, and means for concealing the error by predicting corresponding data using at least one frame which is encoded in a signal other than that in which the error is identified.

Preferably the concealing means is arranged to predict the corresponding data using frames which occur in the video sequence previous and subsequent to the frame in which the error is identified, said previous and subsequent frames being encoded in at least one signal other than that in which the error is identified.

Most advantageously the concealing means is arranged to predict the corresponding data using frames which occur in the video sequence immediately previous and/or subsequent to the frame in which the error is identified, said previous and subsequent frames being present in at least one other signal.

The concealing means may be arranged to initially conceal the error by predicting the corresponding data from a frame occurring previous to the said frame in the same signal as the frame in which the error is identified.

When the encoded signal includes header information, the apparatus may further comprise means for identifying an error in the header of a frame and means for determining whether the frame is an interframe-coded frame, wherein the concealing means is arranged to predict corresponding data using at least one frame which is encoded in a signal other than that in which the error is identified.

BRIEF DESCRIPTION OF THE DRAWINGS

The invention will now be described by way of example only with reference to the accompanying drawings, in which.

According to a multi-threaded video coding scheme such as VRC, a video sequence comprising a plurality of frames 0, 1, 2, 3, . . . n is encoded as at least two threads or signals, each of which represents a subset of frames of the video sequence. Each of the threads is encoded independently of the others and each of the frames of a thread are coded in an INTER-frame manner (although areas of a frame may be coded in an INTRA-frame manner as is well known). Thus at least two threads of INTER-frames are coded and transmitted independently. Each of the INTER-frames (or P-frames) depends on an earlier INTER-frame of the thread but not on any information within the other threads. Frames to be coded are assigned to a thread in an interleaved manner. All threads start from a Sync frame, which may be an INTRA-frame although this is not essential.

DETAILED DESCRIPTION OF THE INVENTION

Figure 1:
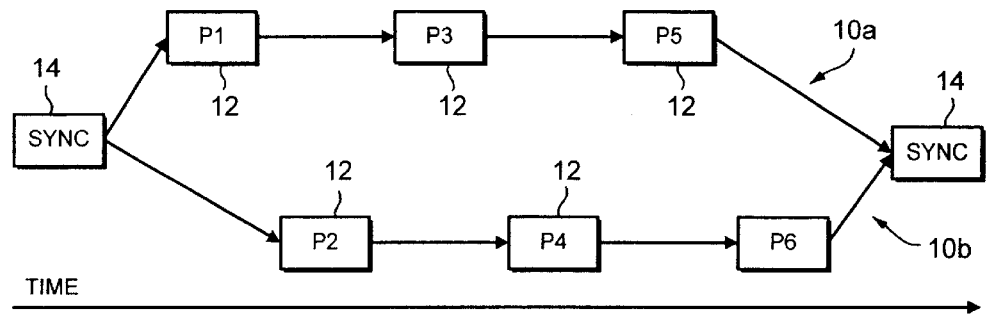
FIG. 1 illustrates a multi-layer video coding scheme with two threads (or signals) and 3 frames per thread.

In the example shown in FIG. 1, the video sequence comprises 2 threads 10a, 10b each of which has three frames 12 per thread. Since only 2 threads are generated, each thread comprises alternate frames of the video sequence. It is to be noted that each thread 10a, 10b converges to a Sync frame 14. In VRC it is intended that the last frame in each thread (i.e. frame 5 of thread 10a and frame 6 of thread 10b) independently generates the same Sync frame 14. Whilst in practice this appears difficult to achieve, simulations show that it is possible to come close enough (see the above paper by Stephan Wenger).

Figure 2:
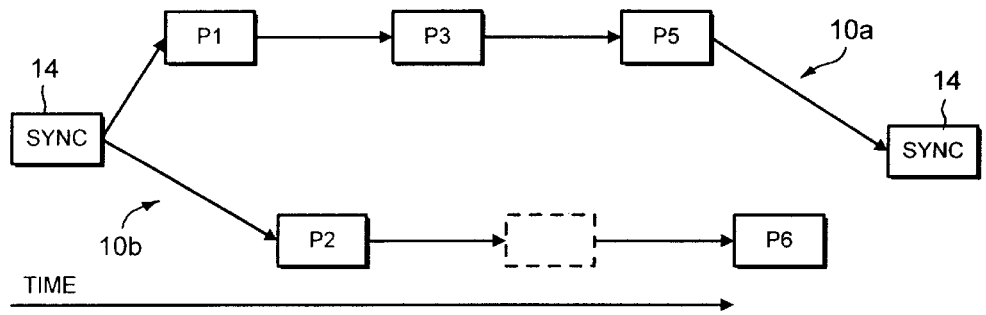
FIG. 2 illustrates the prior art operation of VRC when one of the two threads is damaged.

FIG. 2 illustrates the prior art operation of VRC when one of the two threads or signals is damaged. It has been proposed that if a thread is damaged, the thread is ignored and no longer used to generate the decompressed video sequence. The remaining intact threads are used to generate the video sequence. Say that frame P4 is damaged. The thread 10b is either no longer used to generate the decoded video sequence (which leads to degradation in the frame rate of the resulting video sequence) or the next frame P6 of the thread 10b is decoded with reference to the corrupted frame P4 which means that the error is propagated.

Examples of concealment algorithms in accordance with the invention will now described. As in FIGS. 1 and 2, the examples show two threads (or signals) generated with 3 frames per thread. Assume that there are no transmission errors in the first Sync frame nor in INTER-frames P1, P2, and P3. These frames are thus decoded and displayed normally. Assume that the decoder detects that some parts (but not all) of frame P4 are corrupted. The video decoder then starts to conceal the frame P4 with reference to a frame or frames of the uncorrupted thread 10a. The concealment can be done in conjunction with the decoding of the subsequent frame in the damaged signal.

Figure 3:
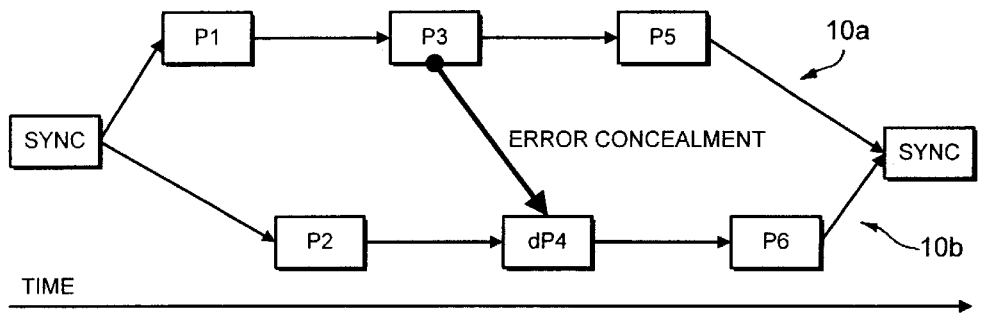
FIG. 3 illustrates one embodiment of the method according to the invention.

FIG. 3 illustrates the operation of a first embodiment of the invention. Suppose that there is a transmission error in the compressed data for frame P4 (marked dP4 in the figure). This frame is decoded but the corrupted frame (dP4) is not usually displayed. However the corrupted areas of frame dP4 are concealed by using a uni-directional interpolation scheme utilising frame P3 of the uncorrupted thread 10a. Let us call the concealed frame P4'. Then error-free frame P5 of the undamaged thread 10a is decoded and displayed normally. Preferably, further concealment is then carried out by bidirectional concealment of frame P4 with reference to frames P3 and P5 of the undamaged thread.

An example of an interpolation algorithm which may be used is discussed further below although other algorithms may be used.

Figure 4:
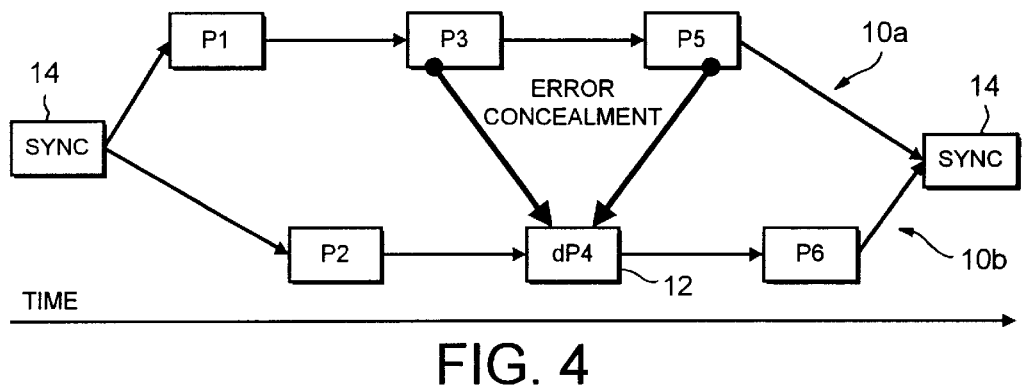
FIG. 4 illustrates a second embodiment of the method according to the invention.

FIG. 4 illustrates the operation of a second embodiment of the invention. Suppose that there is a transmission error in the compressed data for frame P4 (marked dP4 in the figure). This frame is decoded but the corrupted frame (dP4) is not usually displayed. Then error-free frame P5 of the undamaged thread 10a is decoded and displayed normally. After that, according to the invention, the corrupted areas of frame dP4 are concealed by using a bidirectional interpolation scheme utilising frames P3 and P5 of uncorrupted thread 10a. Let us call the concealed frame P4'. The advantage of using bidirectional interpolation from an undamaged thread (as illustrated in FIG. 4) is preferred over uni-directional interpolation (as shown in FIG. 3) since bidirectional interpolation generally gives better concealment results.

In a third embodiment of the invention, the corrupted frame P4 is decoded and the corrupted areas are initially concealed using prior-art concealment methods using the P2 frame. The concealed frame (P4$_c$) is displayed. Then, error-free frame P5 of the undamaged thread 10a is decoded and displayed normally. The concealed areas of frame P4$_c$ are then refined by using a bidirectional interpolation scheme utilising frames P3 and P5 of uncorrupted thread 10a. Let us call the refined concealed frame P4". When decoding P6, frame P4" is used as the reference frame. Since P4" is likely to have better quality than initially concealed frame P4$_c$, the quality of decoded frame P6 (and any subsequent frame in the same temporal prediction thread) is likely to be better too. Then, the decoding process continues normally.

Error concealment can be applied to recover video packets which have been lost or which contain CRC errors (if the transport layer is able to provide CRC error indications). In practice, only the blocks which are referenced in P6 need to be concealed, unless frame P4 is referenced later on (the specification of the Reference Picture Selection mode of H.263 allows this).

In its basic form, bidirectional interpolation for a two-threaded signal is performed as follows. The motion vectors in P5 are divided using the temporal references of the frames P3, P4, and P5 to get forward and backward motion vectors for the frame P4, i.e., forward motion vectors MVf are calculated component-wise (x and y components) by:

$$MVf = \frac{TR_4 - TR_3}{TR_5 - TR_3} * MV_5$$

where $TR_n$ stands for Time Reference of a frame n and $MV_5$ is a motion vector component from frame 3 to 5. Backward motion vectors MVb are calculated in the same way, but the numerator of the scaling factor is then $TR_5-TR_4$ and the sign is opposite to the original sign. The corrupted areas are then predicted from the two temporal directions and the final reconstructed block is a weighted average of the prediction blocks. Again, the time references are used as weighting factors. In mathematical terms, pixel (i,j) of a block at frame P4 [denoted as $Pix_4(i,j)$] is constructed using the following formula:

$$Pix_4(i, j) = \frac{(TR_4 - TR_3) * Pix_3(i + MVf_X, j + MVf_y)}{TR_5 - TR_3} + \frac{(TR_5 - TR_4) * Pix_5(i + MVb_X, j + MVb_y)}{TR_5 - TR_3}$$

For simplicity this method assumes that the motion vector from P5 is directly applicable in the corresponding macroblock position in P4, i.e. motion within the area affected by a certain motion vector is not taken into account. This assumption is made purely to keep this example simple.

Figure 5:
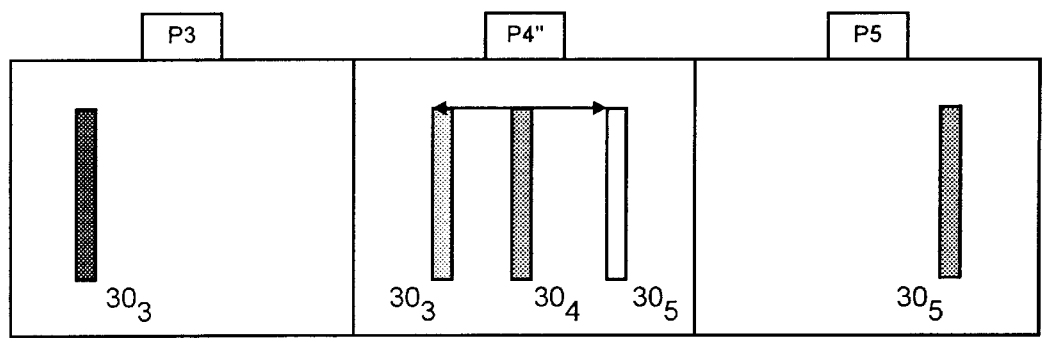
FIG. 5 illustrates an error prediction method which may be used to conceal errors.

FIG. 5 illustrates an exemplary bidirectional interpolation scheme. It represents a very much simplified situation, where the black bar 30 in frame P3 has moved to the right in frame P5 and the colour has lightened (hence the prediction error is nonzero). The subscript denotes the position of the black bar 30 in frame n. When constructing the frame P4" using bidirectional interpolation, motion vector MVf points to the position (30$_3$) where the bar was in the frame P3, and motion vector MVb points to the bar position (30$_5$) in the frame P5. The resulting bar (30$_4$) has a colour which is the weighted average of the reference bars, and its location is also a weighted average of the reference locations. Note that, for simplicity, this example is not block based.

To further improve the algorithm, the following refinements can be made:

1. The frames P3, P4" (or P4') and P5 are compared block by block inside the corrupted area. If blocks at spatially identical positions in P3 and P5 are the same (the block in P5 may have been transmitted as a "not coded" block), but the block is different in P4' (or P4"), the block is most probably corrupted. If the error has not been detected previously, it needs to be concealed. The concealment can be done by copying the corresponding block from P5, which produces a similar result to bidirectional interpolation, but is simpler.

2. Any blocks which have been coded in INTRA mode in frame P5 should be copied to P4' (or P4") directly from P5, since bidirectional interpolation might cause unwanted anomalies.

3. If there are some changes between P3 and P5, which have actually happened in the time period between frames P4 and P5, these changes should not be reflected in the concealed frame P4". In this case, uni-directional interpolation from P3 (i.e. backward prediction) produces better results. This kind of situation can be detected by comparing the changes in error free areas of P4, for example by performing bidirectional interpolation also for the error-free areas and checking which direction produces the more acceptable results. Furthermore, an additional weighting factor can be derived to give more weight to either frame P3 or P5, based on the test interpolation performed on the error-free areas.

4. Bidirectional interpolation itself can also be further improved by fine tuning the motion vectors using for example some prior-art solutions, such as boundary pixel matching. This naturally requires that there are error-free blocks available in P4 to be used in the matching process.

If the frame P4 is completely lost, refinements 3 and 4 cannot be used.

So far error concealment has been discussed with reference to errors in the picture information of the video sequence i.e. in the data that is to be displayed. The invention is also applicable to frames which include errors occurring in the header of the video data. Conventionally such frames would not be recoverable and an INTRA-frame would be requested by the decoder.

Figure 6:
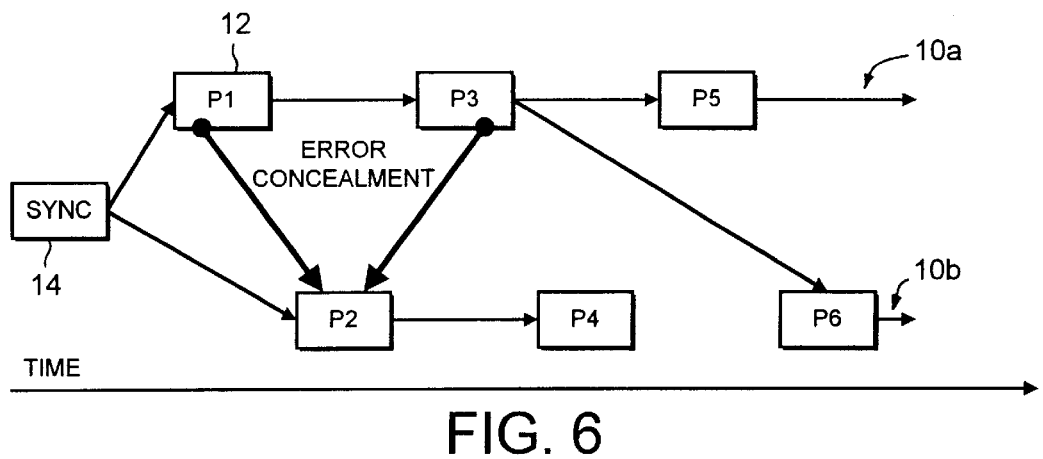
FIG. 6 shows an example of INTER picture header concealment.

FIG. 6 illustrates a further embodiment of the invention. As in the other examples, there are two independent VRC threads. Assume that the picture header of P2 has been corrupted in the transmission channel and the decoder detects the corruption. Instead of immediately posting an INTRA frame request, the decoder waits for the next frame (P3). P3 is interframe coded with respect to frame P1. The decoder therefore determines that the corrupted frame P2 is surrounded by frames belonging to another VRC thread and that P3 is temporally predicted from P1. Thus, it is likely that P2 is also an INTER frame and that an estimation of P2 can be generated using a concealment method as described above with reference to frame P1 and/or P3 of the uncorrupted thread 10a. The decoding then continues as normal.

If the back-channel messaging feature of Reference Picture Selection mode of H.263 is in use, the decoder can signal that the entire P4 image is corrupted and that P3 should be used as a new reference frame for coding. The transmitting encoder receives this back-channel message and codes the next frame belonging to the corrupted thread (P6) using correctly decoded P3 as a reference. In this way, the decoded stream is totally recovered without the need for the transmission of an INTRA frame. If back-channel messaging cannot be used, the decoded stream is totally recovered when the next VRC Sync frame arrives. Meanwhile the initial reference for temporal prediction in the corrupted VRC thread is the reconstructed frame P2.

Thus the invention means that longer threads may be used since INTRA frames are unlikely to be requested so frequently to recover the picture data. The compression efficiency of the multi-layer approach of video redundancy coding is therefore maintained without compromising the resulting picture quality.

Figure 7:
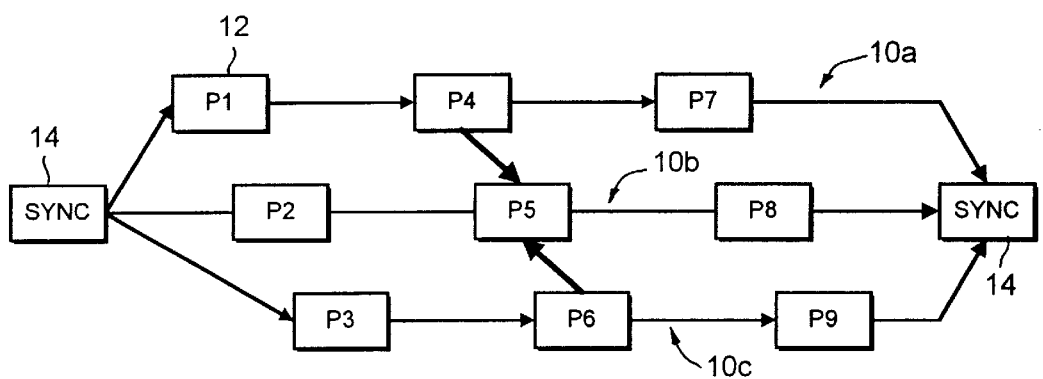
FIG. 7 shows an example of the invention applied to a multi-threaded signal having three threads.

The examples have all been described with reference to two threads having three frames between each Sync frame. However it will be apparent to the reader that the invention is also applicable to embodiments having more than two threads and to threads having more or less than three frames. For instance, FIG. 7 shows a video signal encoded as three threads 10a, 10b and 10c, each thread having three frames 12. Say that frame P5 of thread 10b is corrupted. Errors in the corrupted frame P5 may be concealed by interpolation from frame P4 in the uncorrupted thread 10a and/or from frame P6 in the uncorrupted thread 10c.

For the instance where the errors are concealed by bidirectional prediction from frames P4 and P6 the forward motion vectors are calculated as follows:

$$MVf_5 = \frac{TR_5 - TR_4}{TR_7 - TR_4} * MV_{7/4}$$

where $TR_n$ stands for Time Reference of a frame n and $MV_{7/4}$ is the motion vector component from frame P7 to P4 of thread 10a. Backward motion vectors MVb are calculated in the same way, but from the other uncorrupted thread 10c i.e.:

$$MVb_5 = -\frac{TR_6 - TR_5}{TR_6 - TR_3} * MV_{6/3}$$

The corrupted areas are then predicted from the two temporal directions and the final reconstructed block is a weighted average of the prediction blocks. Again, the time references are used as weighting factors.

Again, for simplicity, this method assumes that the motion vectors from P4 and P6 are directly applicable in the corresponding macroblock position in P4, i.e. motion within the area affected by a certain motion vector is not taken into account. This assumption is made purely to keep this example simple.

Although the Figures show the threads converging to a single Sync frame 14 it should be understood that a Sync frame is coded for each thread 10a, 10b, 10c etc. Hence, in FIG. 7 for example: thread 10a comprises frames 0, 1, 4, 7, 10, 11, 14, 17, 20; thread 10b comprises frames 0, 2, 5, 8, 10, 12, 15, 18 etc.; and thread 10c comprises frames 0, 3, 6, 9, 10, 13, 16, 19 etc; frames 0, 10, 20 etc. being Sync frames 14. The decoder however needs to decode only one occurrence of each Sync frame 14.

Figure 8:
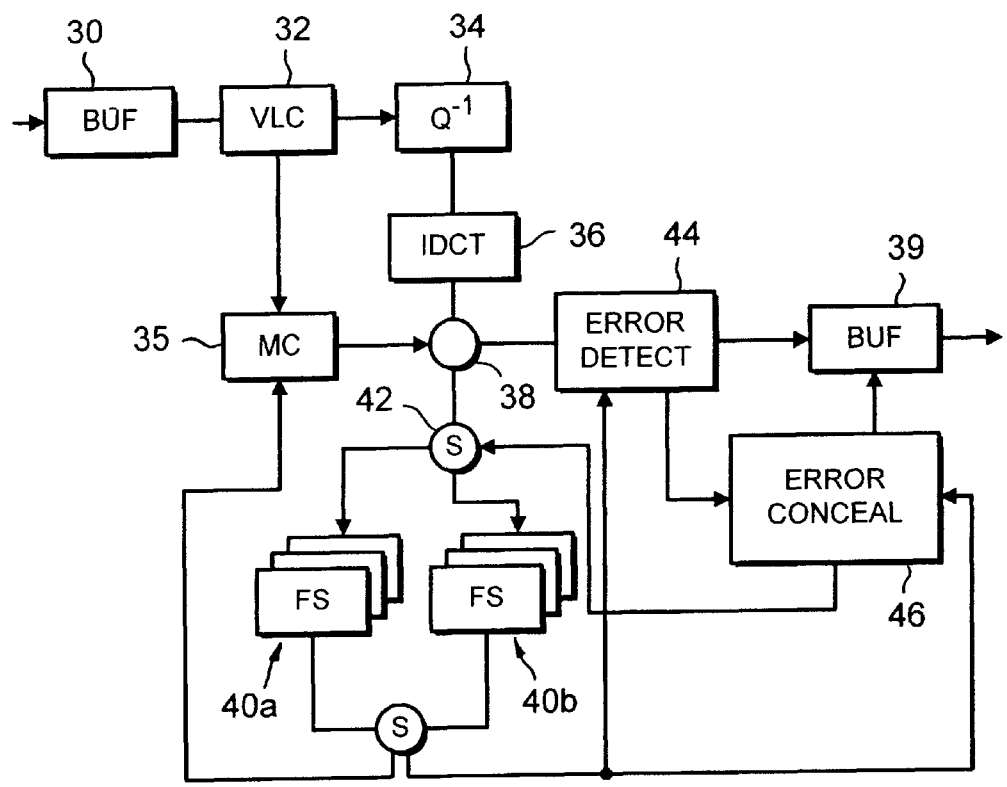
FIG. 8 shows an embodiment of a decoder in accordance with the invention.

FIG. 8 shows an example of a video decoder in accordance with the invention. The decoder shown is arranged to decode a video sequence which has been encoded as two threads. The decoder comprises a buffer 30 for buffering incoming signals. A VLC decoder 32 decodes the incoming signals to retrieve quantised DCT coefficients of the signal which are output to an inverse quantiser 34 and also decodes the motion vector information which is output to motion compensator 35. An inverse DCT transformer 36 carries out an inverse transforms on the de-quantised DCT coefficients from the inverse quantiser 34 and outputs prediction data. The motion compensator 35 alters the picture data of a previous frame in accordance with the motion vectors.

The pixel data output from transformer 36 is added to the picture data of a previous frame from the motion compensator 35 by an adder 38. The resulting picture data is then output to a buffer 39 for subsequent display.

The picture data output from the adder 38 is also stored in a set of frame stores 40a or 40b. The set of stores selected by the switch 42 is determined by the thread being decoded i.e. set 40a stores frames from thread 10a and thread 40b stores frames from thread 10b. The motion vectors are also stored in the frame stores 40a, 40b for use in error concealment.

The motion compensator 35 selects a frame from a set of the frame stores, the set being determined by the frame being decoded i.e. if a frame of thread 10b is being decoded, the previous frame stored in set 40b is input to the motion compensator 35.

An error detector 44 detects errors in the decoded video data. If, during decoding of a frame by the VLC decoder 32, an error is detected, the decoder initiates an error concealment process as described previously. The output of the error detector 44, which was previously connected to the output buffer 39, is switched to connect the output to an error concealment section 46. The error concealment section 46 carries out error concealment on corrupted parts of the current frame with reference to a frame or frames from another uncorrupted thread, as described above. The reconstructed frame is then output to the output buffer 39 for subsequent display. The reconstructed frame is also stored in the appropriate place in the appropriate set of frame stores 40*a* or 40*b* as determined by the switch 42 controlled by the processor (not shown) of the decoder.

The locations of the corrupted areas of the current frame under consideration are also stored in the frame stores 40*a*, 40*b*.

The number of frame stores in each set of frame stores 40*a*, 40*b* is usually two to allow for error concealment in both the forward and the reverse direction from an immediately previous and subsequent frame respectively. However each set of frame stores may comprise a single frame store if only uni-directional prediction is to be used in error concealment.

Clearly the decoder may be provided with more than two sets of frame stores so that a multi-threaded signal having more than two threads may be decoded.

What is claimed is:

1. A method of concealing an error in a frame of a video sequence, including a sequence of frames the method comprising:

encoding the sequence of frames using a VRC method to divide the sequence of frames into at least two independently-encoded signal threads in such a way that the frames are assigned to the threads in an interleaved fashion such that each of the signal threads represents an independently encoded subset of frames of the video sequence; and wherein the decoding of the sequence of frames includes receiving data representing a frame of the video sequence and identifying an error in the frame and concealing the error by predicting corresponding data using at least one frame which is encoded in a signal thread other than that in which the error is identified.

2. A method according to claim 1 further comprising predicting the corresponding data using frames which occur in the video sequence previous and subsequent to the frame in which the error is identified, said previous and subsequent frames being encoded in at least one signal thread other than that in which the error is identified.

3. A method according to claim 2 further comprising predicting the corresponding data using frames which occur in the video sequence immediately previous and subsequent to the frame in which the error is identified, said immediately previous and subsequent frames being encoded in at least one signal thread other than that in which the error is identified.

4. A method according to claim 3 wherein the step of identifying an error comprises comparing areas of the frame with corresponding areas of the immediately previous and subsequent frames and, if areas at spatially identical positions in the previous and subsequent frames are the same but the areas are different in the frame under consideration, the area are deemed to be corrupted.

5. A method according to claim 4 wherein the error is concealed by copying the corresponding area from the subsequent frame.

6. A method according to claim 2 wherein any areas which have been coded in INTRA mode in the subsequent frame are copied directly from the subsequent frame to the corresponding areas of the frame under consideration.

7. A method according to claim 1 wherein the step of concealing the error involves performing bidirectional prediction for error-free areas of the frame under consideration and determining which direction of prediction produces the more acceptable results.

8. A method according to claim 7 further comprising deriving a weighting factor to give more weight to either forward or reverse prediction, based on the test prediction performed on the error-free areas.

9. A method according to claim 3 wherein any areas which have been coded in INTRA mode in the subsequent frame are copied directly from the subsequent frame to the corresponding areas of the frame under consideration.

10. A method according to claim 4 wherein any areas which have been coded in INTRA mode in the subsequent frame are copied directly from the subsequent frame to the corresponding areas of the frame under consideration.

11. A method according to claim 5 wherein any areas which have been coded in INTRA mode in the subsequent frame are copied directly from the subsequent frame to the corresponding areas of the frame under consideration.

12. A method according to claim 2 further comprising initially concealing the error by predicting the corresponding data from a frame occurring previous to the said frame in the same signal thread as the frame in which the error is identified.

13. A method according to claim 3 further comprising initially concealing the error by predicting the corresponding data from a frame occurring previous to the said frame in the same signal thread as the frame in which the error is identified.

14. A method according to claim 4 further comprising initially concealing the error by predicting the corresponding data from a frame occurring previous to the said frame in the same signal thread as the frame in which the error is identified.

15. A method according to claim 5 further comprising initially concealing the error by predicting the corresponding data from a frame occurring previous to the said frame in the same signal thread as the frame in which the error is identified.

16. A method according to claim 6 further comprising initially concealing the error by predicting the corresponding data from a frame occurring previous to the said frame in the same signal thread as the frame in which the error is identified.

17. A method according to claim 2 in which the encoded signals include header information, the method further comprising identifying an error in the header of a frame, determining whether the frame is an inter-frame coded frame and, if so, predicting corresponding data using at least one frame which is encoded in a signal thread other than that in which the error is identified.

18. A method according to claim 3 in which the encoded signals include header information, the method further comprising identifying an error in the header of a frame, determining whether the frame is an inter-frame coded frame and, if so, predicting corresponding data, using at least one frame which is encoded in a signal thread other than that in which the error is identified.

19. A method according to claim 4 further in which the encoded signals include header information, the method further comprising identifying an error in the header of a frame, determining whether the frame is an inter-frame coded frame and, if so, predicting corresponding date using at least one frame which is encoded in a signal thread other than that in which the error is identified.

20. A method according to claim 5 in which the encoded signals include header information, the method further comprising identifying an error in the header of a frame, determining whether the frame is an inter-frame coded frame and, if so, prediciting corresponding data using at least one frame which is encoded in a signal other than that in which the error is identified.

21. A method according to claim 6 in which the encoded signals include header information, the method further comprising identifying an error in the header of a frame, determining whether the frame is an intrer-frame coded frame and, if so, predicting corresponding data using at least one frame which is encoded in a signal other than that in which the error is identified.

22. A method according to claim 2 wherein the step of concealing the error involves performing bidirectional prediction for error-free areas of the frame under consideration and determining which direction of prediction produces the more acceptable results.

23. A method according to claim 3 wherein the step of concealing the error involves performing bidirectional prediction for error-free areas of the frame under consideration and determining which direction of prediction produces the more acceptable results.

24. A method according to claim 4 wherein the step of concealing the error involves performing bidirectional prediction for error-free areas of the frame under consideration and determining which direction of prediction produces the more acceptable results.

25. A method according to claim 5 wherein the step of concealing the error involves performing bidirectional prediction for error-free areas of the frame-under consideration and determining which direction of prediction produces the more acceptable results.

26. A method according to claim 6 wherein the step of concealing the error involves performing bidirectional prediction for error-free areas of the frame under consideration and determining which direction of prediction produces the more acceptable results.

27. A method according to claims 1–6 further comprising initially concealing the error by predicting the corresponding data from a frame occurring previous to the said frame in the same signal thread as the frame in which the error is identified.

28. A method according to claim 1–6 in which an encoded frames include header information, the method further comprising identifying an error in the header of a frame, determining whether the frame is an inter-frame coded frame and, if so, predicting corresponding data using at least one frame which is encoded in a signal thread other than that in which the error is identified.

29. A method according to claim 27 in which the encoded signals include header information, the method further comprising identifying an error in the header of a frame, determining whether the frame is an inter-frame coded frame and, if so, predicting corresponding data using at least one frame which is encoded in a signal other than that in which the error is identified.

30. A method according to claim 27 wherein the step of concealing the error involves performing bidirectional prediction for error-free areas of the frame under consideration and determining which direction of prediction produces the more acceptable results.

31. A method according to claim 28 wherein the step of concealing the error involves performing bidirectional prediction for error-free areas of the frame under consideration and determining which direction of prediction produces the more acceptable results.

32. A method of video decompression comprising: receiving at least two independently encoded signal threads representing a video sequence, said video sequence comprising a sequence of frames, each signal thread representing a sub-set of frames of the video sequence divided from the video sequence using a VRC method such that the frames are assigned to the signal threads in an interleaved fashion;

decoding the frames of the received signal threads to produce data representing frames of the video sequence;

identifying an error in a frame of the video sequence;

concealing the error in the frame by predicting corresponding data using at least one frame which is encoded in a signal thread other than that in which the error is identified; and displaying the frames of the video sequence.

33. A decoder, wherein:

the decoder is arranged to carry out the method of claim 32.

34. Video error concealment apparatus for concealing an error in a frame of a video sequence, said video sequence comprising a sequence of frames and being encoded using a VRC method to divide the sequence of frames into at least two independently-encoded signal threads in such a way that the frames are assigned to the threads in an interleaved fashion such that each of the signal threads represents a independently encoded sub-set of frames of the video sequence, the apparatus comprising:

an input for receiving said at least two signal threads;

means for identifying an error in a frame of the video sequence; and means for concealing the error by predicting corresponding data using at least one frame which is encoded using a VRC method in a signal thread other than that in which the error is identified.

35. Apparatus according to claim 34 wherein the concealing means is arranged to predict the corresponding data using frames which occur in the video sequence previous and subsequent to the frame in which the error is identified, said previous and subsequent frames being encoded in at least one signal thread other than that in which the error is identified.

36. Apparatus according to claim 35 wherein the concealing means is arranged to predict the corresponding data using frames which occur in the video sequence immediately previous and subsequent to the frame in which the error is identified, said previous and subsequent frames being present in at least one signal thread other than that in which the error is identified.

37. Apparatus according to claim 35 wherein the concealing means is arranged to initially conceal the error by predicting the corresponding data from a frame occurring previous to the said frame in the same signal thread as the frame in which the error is identified.

38. Apparatus according to claim 34 wherein an encoded frame includes header information, the apparatus further comprising means for identifying an error in the header of a frame and means for determining whether the frame is an inter-frame coded frame, wherein the concealing means is arranged to predict corresponding data using at least one frame which is encoded in a signal thread other than that in which the error is identified.

39. Apparatus according to claim 35, wherein the concealing means is arranged to initially conceal the error by predicting the corresponding data from a frame occurring previous to the said frame in the same signal thread as the frame in which the error is identified.

40. Apparatus according to claim 36, wherein the concealing means is arranged to initially conceal the error by predicting the corresponding data from a frame occurring previous to the said frame in the same signal thread as the frame in which the error is identified.

41. Apparatus according to claim 35 wherein each encoded signal includes header information, the apparatus further comprising means for identifying an error in the header of a frame and means for determining whether the frame is an inter-frame coded frame, wherein the concealing means is arranged to predict corresponding data using at least one frame which is encoded in a signal thread other than that in which the error is identified.

42. Apparatus according to claim 36 wherein each encoded signal includes header information, the apparatus further comprising means for identifying an error in the header of a frame and means for determining whether the frame is an inter-frame coded frame, wherein the concealing means is arranged to predict corresponding data using at least one frame which is encoded in a signal thread other than that in which the error is identified.

43. Apparatus according to claim 37 wherein each encoded signal includes header information, the apparatus further comprising means for identifying an error in the header of a frame and means for determining whether the frame is an inter-frame coded frame, wherein the concealing means is arranged to predict corresponding data using at least one frame which is encoded in a signal thread other than that in which the error is identified.

* * * * *